(No Model.)

C. M. SEXTON.
TRAIN TIME SIGNAL FOR RAILWAY STATIONS.

No. 317,225. Patented May 5, 1885.

Witnesses:
Percy White
N. E. Aughinbaugh

Inventor:
Charles Murton Sexton
By John J. Halsted & Son
his Attys.

N. PETERS, Photo-Lithographer, Washington, D. C.

UNITED STATES PATENT OFFICE.

CHARLES MURTON SEXTON, OF AURORA, ILLINOIS.

TRAIN-TIME SIGNAL FOR RAILWAY-STATIONS.

SPECIFICATION forming part of Letters Patent No. 317,225, dated May 5, 1885.

Application filed December 3, 1884. (No model.)

*To all whom it may concern:*

Be it known that I, CHARLES MURTON SEXTON, of Aurora, in the county of Kane and State of Illinois, have invented certain new and useful improvements in train-time-signal indicator for the waiting or passenger room of a railway-station; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is a special construction of apparatus for a train-time signal for the waiting or passenger room of a railway-station, whereby the employé may, by blowing into a tube, set the pointer or signal at such figure on a dial conspicuously placed as to show how many minutes (less than an hour) shall elapse before the next train leaves, the construction being such that after being thus correctly set the pointer shall automatically move slowly backward at the same rate of speed as the minute-hand of a standard clock or watch, thereby showing at any after period before the train is to start just how many minutes remain before such starting, the pointer thus indicating the zero or 0 point when it is time to start.

Figure 1:
Figure 2:
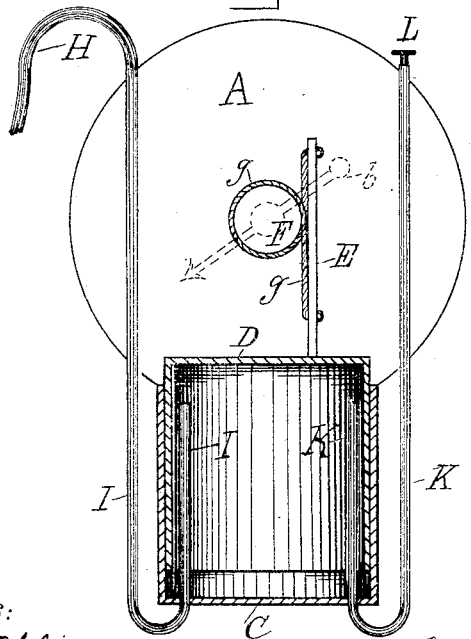
Figure 3:
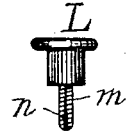
Figure 4:
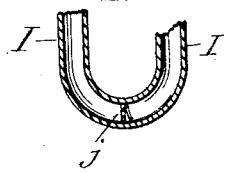

Figure 1 illustrates a front view of the dial of the apparatus and the manner in which the pointer or hand is set to any desired place or figure on the dial; Fig. 2, a rear view of the dial and a vertical section of the vessels with their attached devices; Fig. 3, a detail, and Fig. 4 an enlarged detail view, showing a check-valve in the inlet-tube.

A indicates the dial or signal-plate measured off similarly (though not identically as to its figures) to the dial or face of a time-piece, the figures running around the dial from 0 at its top to the number 55—preferably thus, 5, 10, 15, 20, &c.—the spaces between these points indicating smaller divisions, as of single minutes, as in a time-piece, so that the whole circle is equally divided into sixty marks, each indicating a minute of time, and the number 5 representing five minutes, the number 10 representing ten minutes, &c.

The pointer or index-hand b, (which, when set at a given figure—say, for instance, at 45—denotes that the next train for a place designated by a card hung beneath the dial will leave in forty-five minutes,) is operated by mechanism, now to be described, to move backward on the dial, so as to continually indicate less and less time precisely as the time runs away.

Upon any support or standard suitably elevated against the wall, or in any other convenient place in the passengers' waiting-room, is placed a stationary reservoir or vessel, C, and a rising and falling air-chamber, D, closed at its top and open at its bottom, is placed within the reservoir C, and in the latter is placed a sufficient quantity of liquid to make a tight sealing or liquid joint to prevent the escape of air as the chamber D rises and falls, these parts C and D being very similar to the two parts of the gas-holders of a gas-works. The liquid to be used is preferably such as is not likely to thicken materially or to become frozen—as, for instance, glycerine, alcohol, mercury, &c. The air-chamber D has one or more upwardly-projecting posts or bars, E, which must rise and fall with it, and this is connected with the shaft F, on which the pointer b is fastened, either by a rack on the bar and a pinion on the shaft, or by a cord, g, coiled around the shaft, and connected at its ends to the bar at such points as to allow the bar to rise and fall, and by turning the shaft to operate the pointer; or a counter-balance may be attached to the end of the cord after it has passed up to and been coiled around the shaft, such counter-balance serving to facilitate the raising of and also prevent a too rapid descent of the air-chamber after it has been raised.

The mode of supplying the air-chamber with air, the mode of raising it, and the mode of regulating the exit of air from this chamber, in order to insure that the movement of the pointer shall coincide in time with the movement of the minute-hand of a standard watch or clock, will now be described.

H is a tube or hose, into which the employé blows when he wishes to set the dial-hand or pointer to any given figure on the dial-plate, and this tube, preferably flexible, connects with a siphon-shaped pipe, I, which enters the bottom of the vessel C and passes up nearly to the top of the chamber D. At or near its bend $j$ is placed a check-valve or other equivalent device, which will prevent the air flowing back in this pipe I. Another similar siphon-pipe, K, also is similarly placed within the chamber D, and on the outside of the vessel it extends upward, as shown, and is provided at its top with a regulating-valve, L, of any suitable kind, serving to control to any desired degree the exit of air escaping from the air-chamber when the apparatus is at work and the pointer in motion. I find a screw or tapering screw, M, makes an efficient valve for this purpose, a vertical diminishing groove, $n$, being made thereon, so that as the screw is turned farther in or out it will adjust the size of the opening through which the air may gradually escape. The apparatus being ready the employé simply blows into the tube I until the injected air raises the chamber to a height sufficient to revolve the shaft to carry the pointer around to the proper figure on the dial—viz., the figure which expresses the number of minutes before the next train leaves. He then leaves it, and its hand commences to move in the opposite direction, correctly indicating the passing minutes until it arrives at 0 on the dial, and at which time the train starts.

The advantages are evident. It is always controlled and regulated by the railway officials' standard time, the passenger needs to make no inquiries of the ticket-seller or other officers as to the time of starting, the passenger needs no watch of his own to determine whether he has any time to spare, nor is there any risk of losing a train by a difference in time of the travelers' watches, and an instant's glance at the pointer, on coming into the door of a passenger-room, informs the passenger at once, without a word, whether he has any and how much time to spare.

A dial and pointer may be placed at the opposite end of shaft, and the cord passed around said shaft in the opposite direction will run this hand or pointer ahead instead of backward, and in which case this signal can be located where it may be seen outside the building and used as a train-signal to indicate to a passing or arriving train how long since the next preceding train left. In such case this additional pointer would be set at zero and would stop at 45. I have also arranged to set the pointer with a key placed on the end of the shaft, and in such case the blow-pipe would or might be dispensed with.

I claim—

1. A pneumatic train-time signal or indicator having, in combination, an air-tube through which air may be blown, a rising and falling air-chamber raised and supplied with air by means of such tube, and a pointer on a dial adapted to be set by the rising of such chamber to any desired figure on a dial to indicate the number of minutes before the next train leaves for a given destination, the pointer then automatically moving and continuing to indicate the minutes until the train leaves.

2. In combination with an air-receiving tube, H I, the vessel C, air-chamber D, the revolving pointer-shaft actuated by the movement of said chamber, and an air-exit pipe provided with a regulating-valve adapted for controlling the exit of the air and the movement of the pointer.

3. In combination, the tube H I, valve $j$, chambers C D, rod or post E, dial-shaft and pointer, tube K, and its regulating-valve, substantially as shown and described.

4. In a railway-signal, the combination of a vessel, C, air-chamber D, pointer-shaft actuated by the movement of said chamber, and an air-exit pipe, K, provided with a regulating-valve, and means, as described, for setting the shaft and its pointer.

CHARLES MURTON SEXTON.

Witnesses:
C. H. REEVES,
W. T. REEVES.